United States Patent
Anderson et al.

(10) Patent No.: US 11,270,275 B2
(45) Date of Patent: Mar. 8, 2022

(54) ONE CARD

(71) Applicant: Comenity LLC, Columbus, OH (US)

(72) Inventors: Chris Anderson, Columbus, OH (US); Jess Lawrence, Lewis Center, OH (US); Manoj Ram Tammina, Columbus, OH (US)

(73) Assignee: Comenity LLC, Columbus, OH (US)

( * ) Notice: Subject to any disclaimer, the term of this patent is extended or adjusted under 35 U.S.C. 154(b) by 0 days.

(21) Appl. No.: 16/688,010

(22) Filed: Nov. 19, 2019

(65) Prior Publication Data

US 2021/0049565 A1 Feb. 18, 2021

Related U.S. Application Data

(60) Provisional application No. 62/888,290, filed on Aug. 16, 2019.

(51) Int. Cl.
| | |
|---|---|
| *G06Q 20/10* | (2012.01) |
| *G06Q 20/40* | (2012.01) |
| *G06Q 20/20* | (2012.01) |
| *G06Q 40/02* | (2012.01) |
| *G06Q 30/02* | (2012.01) |
| *G06Q 20/04* | (2012.01) |

(52) U.S. Cl.
CPC ............ *G06Q 20/10* (2013.01); *G06Q 20/04* (2013.01); *G06Q 20/20* (2013.01); *G06Q 20/40* (2013.01); *G06Q 30/02* (2013.01); *G06Q 40/02* (2013.01)

(58) Field of Classification Search
CPC ........ G06Q 20/10; G06Q 20/04; G06Q 20/20; G06Q 20/40; G06Q 30/02; G06Q 40/02
USPC ........................................ 705/3–44
See application file for complete search history.

(56) References Cited

U.S. PATENT DOCUMENTS

| | | | | |
|---|---|---|---|---|
| 8,285,329 | B1 * | 10/2012 | Zhu ................. | G06Q 20/3223 455/558 |
| 8,566,239 | B2 * | 10/2013 | Arthur .................. | G06Q 10/00 705/41 |
| 8,879,846 | B2 * | 11/2014 | Amtrup .............. | G06K 9/00442 382/190 |
| 9,082,119 | B2 * | 7/2015 | Ortiz .................. | G06Q 20/3221 |
| 9,292,870 | B2 * | 3/2016 | Langley ............. | G06Q 30/0601 |
| 10,657,520 | B2 * | 5/2020 | Zarakas ........... | G06K 19/07722 |
| 2008/0126145 | A1 * | 5/2008 | Rackley III .......... | G06Q 20/102 455/406 |

(Continued)

OTHER PUBLICATIONS

Chevreau, "Finances all under one roof: Accounts hold mortgages, offer debt and savings", Postmedia Network Inc., Canada, Regina, Sask, Proquest Document Id: 351191454, Mar. 24. (Year: 2010).*

*Primary Examiner* — Frantzy Poinvil

(57) ABSTRACT

A system and method for combining at least two similarly managed credit accounts into a single ONE card account is described. The system identifies a given cardholder having a plurality of similarly managed credit accounts. Generates a single ONE card account for the given cardholder. Incorporates the plurality of similarly managed credit accounts into the single ONE card account. Manages any future transactions for each of the plurality of similarly managed credit accounts via the single ONE card account. Provides, to the given cardholder, a single ONE card account statement, the single ONE card account statement containing information previously provided separately by each of the plurality of similarly managed credit accounts.

19 Claims, 4 Drawing Sheets

(56) References Cited

U.S. PATENT DOCUMENTS

| | | | |
|---|---|---|---|
| 2008/0208744 A1* | 8/2008 | Arthur | G06Q 20/105 |
| | | | 705/41 |
| 2011/0166992 A1* | 7/2011 | Dessert | G06Q 20/0655 |
| | | | 705/39 |
| 2014/0019352 A1* | 1/2014 | Shrivastava | G06Q 20/326 |
| | | | 705/41 |
| 2014/0046788 A1* | 2/2014 | Lee | G06Q 20/363 |
| | | | 705/21 |
| 2014/0136353 A1* | 5/2014 | Goldman | G06Q 20/405 |
| | | | 705/21 |
| 2014/0279474 A1* | 9/2014 | Evans | G06Q 20/40 |
| | | | 705/41 |
| 2015/0058146 A1* | 2/2015 | Gaddam | G06Q 20/227 |
| | | | 705/21 |
| 2016/0162885 A1* | 6/2016 | Bondesen | G06Q 20/3674 |
| | | | 705/66 |
| 2018/0025331 A1* | 1/2018 | Dallenbach | G06Q 20/36 |
| | | | 705/39 |
| 2019/0188677 A1* | 6/2019 | Arthur | H04W 4/24 |
| 2020/0111084 A1* | 4/2020 | Ward | G06Q 20/381 |

* cited by examiner

300

```
┌─────────────────────────────────────────────┐
│ IDENTIFIES, AT A COMPUTER SYSTEM, A FIRST    │
│ CREDIT ACCOUNT AND A SECOND DIFFERENT CREDIT │
│ ACCOUNT ASSOCIATED WITH A CARDHOLDER, THE    │
│ FIRST CREDIT ACCOUNT AND THE SECOND          │
│ DIFFERENT CREDIT ACCOUNT MANAGED BY A        │
│ SINGLE ENTITY                                │
│                    305                       │
└─────────────────────────────────────────────┘
                      │
                      ▼
┌─────────────────────────────────────────────┐
│ GENERATES, AT THE COMPUTER SYSTEM, A SINGLE  │
│ ONE CARD ACCOUNT FOR THE CARDHOLDER          │
│                    310                       │
└─────────────────────────────────────────────┘
                      │
                      ▼
┌─────────────────────────────────────────────┐
│ INCORPORATES, AT THE COMPUTER SYSTEM, THE    │
│ FIRST CREDIT ACCOUNT AND THE SECOND          │
│ DIFFERENT CREDIT ACCOUNT INTO THE SINGLE     │
│ ONE CARD ACCOUNT                             │
│                    315                       │
└─────────────────────────────────────────────┘
                      │
                      ▼
┌─────────────────────────────────────────────┐
│ MANAGES, AT THE COMPUTER SYSTEM, ANY FUTURE  │
│ TRANSACTIONS FOR THE FIRST CREDIT ACCOUNT    │
│ AND THE SECOND DIFFERENT CREDIT ACCOUNT      │
│ WITH THE SINGLE ONE CARD ACCOUNT             │
│                    320                       │
└─────────────────────────────────────────────┘
```

FIG. 3

ONE CARD

CROSS-REFERENCE TO RELATED APPLICATIONS (PROVISIONAL)

This application claims priority to and benefit of U.S. Provisional Patent Application No. 62/888,290 filed on Aug. 16, 2019, entitled "ONE CARD" by Anderson et al., and assigned to the assignee of the present application, the disclosure of which is hereby incorporated by reference in its entirety.

BACKGROUND

Brands often use private label credit accounts, reward programs, and the like to promote customer shopping, loyalty, sales, and related interaction. However, a smaller retailer or brand may not find private label accounts to be cost effective. Further, as technology changes, there are costs that are necessitated to update point-of-sale systems, and the like. For a brand with a large number of stores, such upgrade costs can also be prohibitive and cause the brand to fall behind technologically, which can drive tech savvy customers to a different brand.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 3 depicts a flow diagram for a method for combining at least two similarly managed credit accounts into a single ONE card account in accordance with an embodiment.

DESCRIPTION OF EMBODIMENTS

Figure 1:
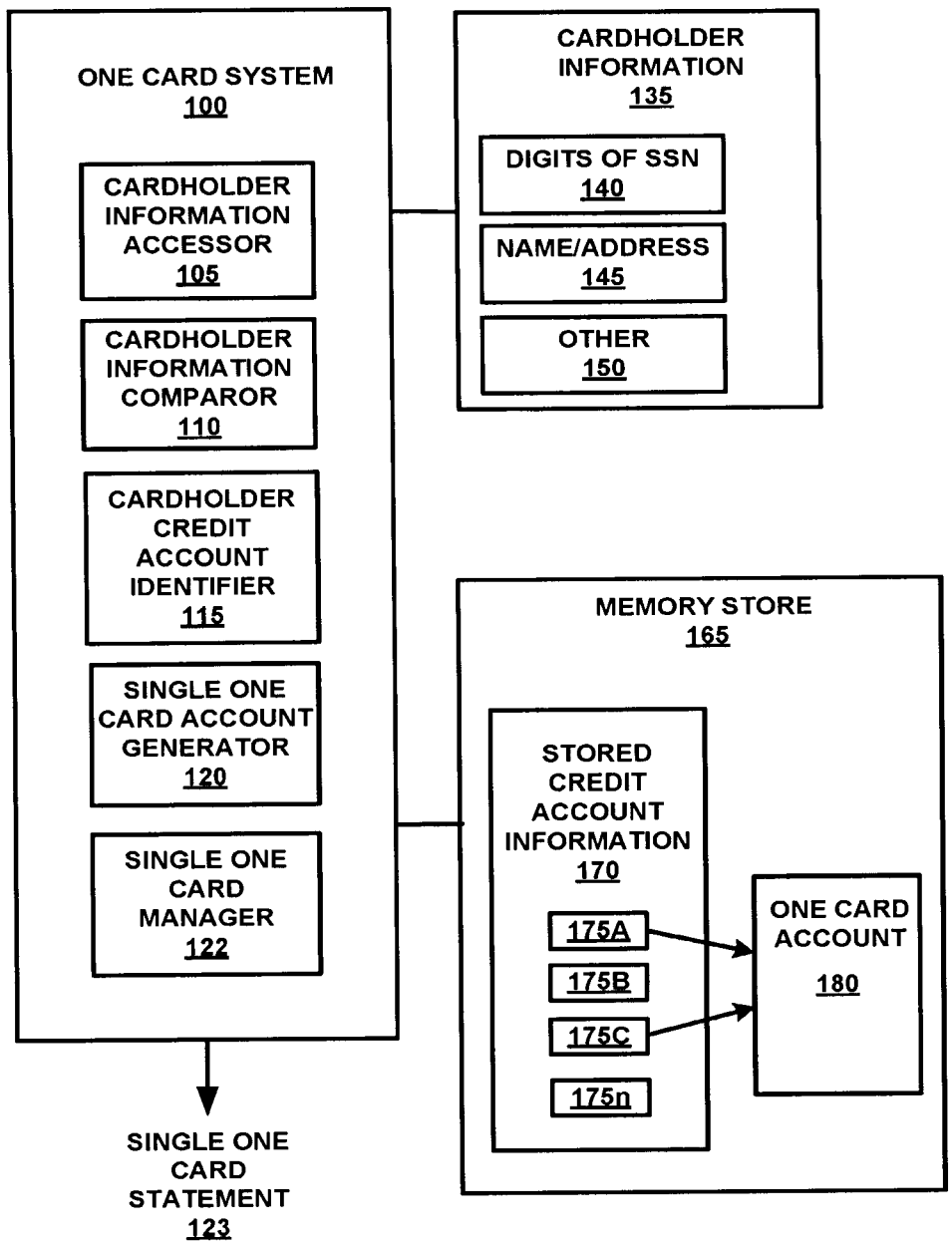
FIG. 1 is a block diagram of a ONE card system, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure information of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

The term "store" is used herein to describe a specific place where one or more products can be bought or sold. It can be a brick and mortar location such as "Stanley shoe store at 1 main street", it can be a virtual location such as a website, or the like.

The term "retailer" is used herein to describe the specific store (e.g., the Stanley shoe store at 1 main street) or website that provides goods and/or services.

The term "customer" is used herein to describe an actual or potential consumer of the retailer's goods and/or services.

The term "brand" is used herein to describe a collection of retailer's stores (e.g., Stanley shoes).

The term "private label credit card" (PLCC) is used herein to describe a credit card that is intended for use at a specific brand of stores. The PLCC is a type of revolving credit plan managed by a bank or commercial finance company. The PLCC is often issued without an expiration date.

The term "co-branded account" is used herein to describe a general purpose open-end revolving line of credit which is established by a credit provider for an accountholder pursuant to the terms of a credit agreement and in accordance with card association rules and regulations, and marketed with retailer's mark and the trade names and/or logos of a card association.

The term "universal PLCC" (UPLCC) is used herein to describe a private label account that issues with an association logo on the back of the associated credit card, the UPLCC usually has limited use. In some cases, the UPLCC can be a part of a conglomerations of different brands that utilize the same card association.

The term "cardholder" is used herein to describe a customer that has obtained at least one PLCC, co-branded account, or UPLCC.

Overview

One in three women in the United States are cardholders with an active PLCC. Of those that have an active PLCC, 30% have at least two active PLCC accounts that are managed by the same bank or commercial finance company. These cardholders with multiple cards also have to maintain usernames and passwords for each of their PLCC accounts and must manage each of their different PLCC accounts via different apps, by login into different URL's.

As discussed herein, private label programs (e.g., PLCC accounts) are associated with credit accounts (e.g., physical cards, virtual cards, etc.) that can only be used at that brand. Often, the brand will provide loyalty programs, card holder opportunities, special shopping days, rewards for purchases, and the like for PLCC cardholders which are used to promote the cardholders to return to the store for repeat purchases.

Some PLCC brand partners are also aware of the cardholder's desire to move into a digital or virtual environment. As such, the brands would like to be able to utilize near field communication (NFC) or the like, for accepting payment from a cardholder's mobile device. Moreover, PLCC brand partners would also like to have more secure cards, such as cards with EMV (a global standard for cards equipped with computer chips and the technology used to authenticate chip-card transaction) and other online protections.

However, the cost of incorporating the changes can include upgrade time, retailer point of sale (POS) upgrades and other changes to the PLCC system that may not be desired by every brand or every cardholder. For example, there will always be the cardholders (and/or brands) that do not embrace mobile device transactions, that do not have mobile devices that can perform the transactions, that simply prefer the use of the physical card at the POS, and the like.

In one embodiment, the disclosed ONE card solution will also allow brands that want features such as, but not limited to, a virtual card (stored in a digital wallet or within an app on a cardholder's mobile device), NFC payment, and the like, to convert their PLCC program to a UPLCC program that uses a co-branded credit card company's rails for the transaction.

Additionally, there is a minimum size for a brand before the opportunity to establish a PLCC is made available. For example, a small retailer or brand may only have one or a handful of stores and, as such, the small retailer would not be able to bring in enough cardholders to justify the management (and other related) expenses that come with a PLCC. Thus, while many smaller brands would like to be able to utilize the PLCC to promote cardholder loyalty, until the brand obtains a minimum number of shoppers likely to sign up for the PLCC, the expense associated with a cobrand program will continue to outweigh the returns the smaller brand (or bank or commercial finance company) would receive.

However, the disclosed ONE card solution will also allow brands that are too small to obtain their own PLCC to join in with other brands under the ONE card solution. For example, Bob's Shoe shop may only have a customer base of approximately 100. As such, they cannot obtain the PLCC that promotes customer loyalty, provides word of mouth (and social media) desire for the PLCC, or the like. However, a non-competing (or collaborative) retailer such as Lisa's pharmacy with an existing PLCC could allow Bob's Shoe shop to join in the ONE card account associated with Lisa's pharmacy. In so doing, Bob's Shoe shop would be able to have an otherwise unavailable branded credit account.

Importantly, the embodiments of the present invention, as will be described below, provide an approach for combining at least two similarly managed credit accounts into a single ONE card account which differs significantly from the conventional processes used by PLCC systems. In conventional approaches, the brand needs to be of a certain size before a PLCC is financially viable. Here, the present embodiments, as will be described and explained below in detail, provide a previously unknown procedure to provide a brand below the certain size the ability to obtain a UPLCC that provides brand identification, promotes customer loyalty, provides word of mouth (and social media) presence, and the like. Moreover, the present embodiments provide real-time combined presentation of credit account information from a plurality of different similarly managed credit accounts. The ability to combine the credit account information without having to reissue brand specific cards will provide significant cost savings to the credit account provider. Moreover, by combining the statements from each individual brand into the single ONE card statement, the credit account provider can save money, reduce their credit account management footprint, and continue to receive category and sku level data from the retailer for any transactions.

As will be described in detail, the various embodiments of the present invention do not merely implement conventional PLCC account processes on a computer. Instead, the various embodiments of the present invention, in part, provide a previously unknown procedure to integrate at least two similarly managed credit accounts into a single ONE card account. Moreover, the present embodiments provide the cardholder with previously unavailable technology such as contactless payment, EMV tap and dip, and co-branded rails at their brand while the cardholder will continue to earn all of their rewards from existing PLCC cards that can only be used at those retailers. Hence, embodiments of the present invention provide a novel process for updating PLCC accounts into a single ONE card account which is necessarily rooted in computer technology to overcome a problem specifically arising in the realm of technological development, brand abandonment due to a lack of technology upgrades, and the like.

Moreover, the embodiments do not recite a mathematical algorithm; nor do they recite a fundamental economic or longstanding commercial practice. Instead, they address a business challenge of keeping a PLCC relevant as technology continues to drive new business practices, modify spending locations (POS, in-store non POS, Internet shopping, etc.), modify shopping habits (e.g., social media sharing, brand shaming/bragging, social influencers, and the like). Thus, the embodiments do not "merely recite the performance of some business practice known from the pre-Internet world along with the requirement to perform it on the Internet." Instead, the embodiments are necessarily rooted in keeping a retail brand up to date with new, emerging, and yet to emerge technology.

Further, the ONE card solution also gives the brand the option of allowing its cardholders to decide on whether or not they want one or more of the features such as, a virtual card stored in a digital wallet (or within an app on a mobile device), NFC payment, and the like. For example, the brand can allow the cardholder to decide if they would like to obtain the features provided by converting from a PLCC program to a UPLCC, instead of converting every PLCC program to a UPLCC program.

Operation

With reference now to FIG. 1, a block diagrams of a ONE card system 100 is shown in accordance with an embodiment.

Cardholder expectations continue to grow as they expect and demand more convenient ways to manage their finances and their life. For example, prior to the explosion of mobile devices, a cardholder would carry their PLCC card(s) in a wallet, purse, etc. Each PLCC took up a given amount of real-estate and a cardholder with a number of PLCC cards could end up with a very large wallet with many different cards, e.g., a shoe store card, a number of department store cards, a grocery store card, a number of clothing store cards, and the like. However, now that most cardholders constantly carry a mobile device, they often want the PLCC to be a virtual product instead of a physical card. The virtual product could be within an app or in a digital wallet that is on the cardholder's mobile device. In so doing, the cardholder is able to have a smaller PLCC card collection physical footprint. However, even with the use of a digital account instead of a physical card, the cardholder still has different bills, different due dates, and must manage each of the different PLCC accounts every month. The ONE card system 100 disclosed herein provides the customer, brand, and credit account provider solution.

ONE card system 100 includes a cardholder information accessor 105, a cardholder information comparor 110, a cardholder credit account identifier 115, a single ONE card account generator 120, and a single ONE card statement provider 122. In one embodiment, ONE card system 100 is coupled with a memory store 165.

The cardholder information accessor 105 is configured to access cardholder information 135 that is particular to a cardholder. The cardholder information 135 could include a number of different cardholder information types that will allow for an identification of a specific cardholder. For example, in one embodiment, the cardholder identification information is some or all of the digits of a social security number 140 of the cardholder.

In another embodiment, the cardholder information 135 is a cardholder's name and home address 145. In yet another embodiment, the cardholder information 135 is any other 150 type and quantity of cardholder identification information (e.g., a driver's license number or portion thereof, a birthday, email address, mobile phone number, or the like), or a combination of some or all of the digits of a social security number 140, name and home address 145, other 150 and the like.

The cardholder information comparor 110 compares the received set of cardholder information 135 to credit account information 170 stored in a memory store 165. In one embodiment, the memory store 165 is a database coupled to the ONE card system 100. In another embodiment, the memory store 165 resides on the cardholder's mobile device (such as in one or more applications, in a mobile wallet, or the like).

The credit account information 170 includes credit account information (e.g., credit account 175A, credit account 175B, credit account 175C, and credit account 175n . . . [hereinafter, "set of credit accounts 175", unless otherwise specified]. Moreover, each credit account in the set of credit accounts 175 is associated with a cardholder.

In one embodiment, a credit card associated with the credit account could be any type of credit account such as a private label credit card (PLCC) account, a co-branded credit account, a universal PLCC account, or the like. Further, the private label may be a retailer that provides goods and/or services, regardless as to whether or not the retailer has an actual physical place. In one embodiments, the private label associated with the credit account is a physical store, a virtual store, an automobile loan account, etc.

The cardholder credit account identifier 115 uses the information obtained from the comparing performed by the cardholder information comparor 110 to identify any credit accounts, from the set of credit accounts 175 that are associated with the same cardholder.

In one embodiment, cardholder credit account identifier 115 also performs a conflict of interest evaluation between the set of credit accounts 175 that are associated with the same cardholder. For example, if credit account 175A is Jan's clothing brand, and credit account 175B is Ed's clothing brand that is in direct competition with Jan's clothing brand, then even if the credit accounts 175A and 175B are held by the same cardholder, they would not be available for combining into the single ONE card account.

However, when (non-competitive, non-conflicting, credit accounts with previously agreed upon collaborations, or the like) credit accounts are found (e.g., credit accounts 175A and 175C) for a given cardholder, a single ONE card account generator 130 will generate a single ONE card account 180. The single ONE card account generator 130 will then incorporate (or otherwise associate) the plurality of similarly managed credit accounts (e.g., credit accounts 175A and 175C) into the single ONE card account credit account 180. Although two credit accounts are discussed, the single ONE card account solution is capable of managing any number of different credit accounts. The use of two credit accounts in the instant discussion is provided as one embodiment for purposes of clarity.

Single ONE card account manager 122 manages any future transactions for each of the plurality of similarly managed credit accounts (e.g., credit accounts 175A and 175C) via the single ONE card account 180. In addition, single ONE card account manager 122 generates a single ONE card account statement 123 and provides it to the given cardholder.

In one embodiment, the single ONE card account statement 123 contains information that was previously provided separately by each of the plurality of similarly managed credit accounts (e.g., credit accounts 175A and 175C) incorporated (combined, merged, etc.) into the single ONE card account 180.

In one embodiment, single ONE card account manager 122 determines a first credit account balance for the first credit account 175A and determines a second different credit account balance for the second different credit account 175C. When single ONE card account manager 122 generates the single ONE card account statement 123 it will include a first payment due date for the first credit account 175A and a second payment due date for the second different credit account 175C.

In one embodiment, single ONE card account manager 122 determines a first credit account balance for the first credit account 175A and determines a second different credit account balance for the second different credit account 175C. Single ONE card account manager 122 will combine the first credit account balance and the second different credit account balance into a single ONE card account balance. Then, when single ONE card account manager 122 generates the single ONE card account statement 123 it will include a single payment due date for the single ONE card account 180.

In one embodiment, single ONE card account manager 122 will manage additional information for one/any/or all of the incorporated credit accounts (e.g., credit accounts 175A and/or 175C) into the single ONE card account 180. In one embodiment, the additional information can be, but is not limited to, an amount of available credit, a purchase history, a rewards balance, a number of rewards earned, an offer, loyalty information, and the like.

In one embodiment, single ONE card account manager 122 will also provide a single ONE card reward earnings from the single ONE card account. For example, the single ONE card reward earnings could be a percentage back, a reward when a spending level is reached, or the like.

In one embodiment, single ONE card account manager 122 will include any or all of the additional information in the single ONE card account statement 123. In one embodiment, the single ONE card account statement 123 is a physical statement that is provided to the cardholder (e.g., a monthly credit account statement).

In one embodiment, single ONE card account statement 123 could be an electronic statement that is electronically available to the cardholder and can include real-time and near real-time account information. Moreover, in one embodiment, single ONE card account statement 123 could be available via a website, part of an app that can be loaded on the cardholder's computer system (e.g., mobile device, smart watch, smart device, notebook, laptop, desktop, etc.), or the like.

In one embodiment, single ONE card system 100 will automatically add a ONE card application that includes the single ONE card account to a mobile device of the cardholder.

In one embodiment, single ONE card system 100 will automatically add the single ONE card account to a digital wallet on a mobile device of the cardholder. In addition, in one embodiment, single ONE card system 100 will leave the first credit account 175A and the second different credit account 175C in the digital wallet, such that the cardholder can utilize either the single ONE card account 180 or the original credit account to make a purchase. For example, if first credit account 175A is a PLCC for Jen's doughnuts, the cardholder could go to Jen's doughnuts and then make a purchase with either the first credit account 175A or single ONE card account 180. In either case, the purchase would be received by single ONE card system 100 and managed by single ONE card manager 122.

In one embodiment, single ONE card system 100 will automatically add the single ONE card account to a digital wallet on a mobile device of the cardholder and remove the first credit account 175A and/or the second different credit account 175C from the digital wallet.

In one embodiment, single ONE card system 100 will provide a physical single ONE card to the cardholder. In addition, in one embodiment, single ONE card system 100 will leave the physical cards associated with (one or more of) the first credit account 175A and the second different credit account 175C active. In so doing, the cardholder can utilize either the physical single ONE card or the original credit account physical cards to make a purchase. For example, if first credit account 175A is a PLCC for Jen's doughnuts, the cardholder could go to Jen's doughnuts and then make a purchase with either the first credit account 175A physical card or the single ONE card account 180 physical card. In either case, the purchase would be received by single ONE card system 100 and managed by single ONE card manager 122.

In one embodiment, single ONE card system 100 will provide a physical single ONE card to the cardholder of the cardholder and cancel the physical cards associated with (one or more of) the first credit account 175A and the second different credit account 175C. In so doing, the physical single ONE card will replace the first credit account physical card and/or the second different credit account physical card.

In one embodiment, single ONE card account manager 122 will provide a reward exchange capability, such as described in U.S. patent application Ser. No. 16/042,142 entitled "an intermediary to manage a point exchange across a plurality of different reward programs" assigned to the assignee of the present Application and incorporated by reference in its entirety herein.

In one embodiment, the reward exchange capability provides the cardholder with the ability to exchange any of the first reward earnings, the second reward earnings, and/or the single ONE card reward earnings with any other of the first reward earnings, the second reward earnings, and/or the single ONE card reward earnings.

In one embodiment, single ONE card account manager 122 can use the incorporated credit accounts (e.g., credit accounts 175A and/or 175C) and or single ONE card account 180 in conjunction with a purchase request to adjust a cardholder's credit limit based on the purchase request. For example, if a cardholder is looking at purchasing something for 500 dollars at the retailer of credit account 175A, but the cardholder has less than 500 dollars in credit remaining on their credit account 175A, single ONE card account manager 122 could determine the difference and perform a credit reevaluation (either a brand specific credit reevaluation and/or a single ONE card credit account). In so doing, the result of the credit reevaluation may be an increase in the cardholder's credit limit to allow a purchase of a product at an amount higher than a cardholder's present credit limit. In other words, the single ONE card system 100 could determine that the cardholder would be able to receive an increase in the credit limit. In general, the determination may be based on a credit check, the cardholder's credit history, an intended credit increase, and the like.

Moreover, in one embodiment, single ONE card system 100 operating as an app on the cardholder's mobile device will allow the cardholder to use their single ONE card account 180 to make a purchase via the single ONE card application without requiring the cardholder to transfer information between mobile device 101 and the POS at the checkout. Instead, the payment portions of the checkout would be performed completely within the application running on the cardholder's mobile device.

Figure 2:
FIG. 2 is a diagram of a plurality of mobile device screenshots illustrating different aspects of a single ONE card account in accordance with an embodiment.

Referring now to FIG. 2, a diagram of a plurality of mobile device 101 screenshots is shown in accordance with an embodiment. Although a plurality of screenshots is shown, it should be appreciated that the screenshots are provided for purposes of example and clarity. It is possible that one or more of the screenshots may differ in information from what is actually shown based on personal preference, legislation, retail application preference and the like.

Mobile device 101 may be a mobile phone, a smart phone, a tablet, a smart watch, a piece of smart jewelry, smart glasses, or other user portable computational devices having wireless connectivity. That is, mobile device 101 would be capable of broadcasting and receiving via a cellular network, WiFi, near field communication, and the like. In one embodiment, mobile device 101 may have a positioning determining system. In another embodiment, mobile device 101 may be able to determine location within a given radius, such as the broadcast range of a beacon, WiFi hotspot, overlapped area covered by a plurality of mobile telephone signal providers, or the like. In general, mobile device 101 will have an operating system and one or more application operating thereon.

In general, screenshot 201 shows a single ONE card application as presented on mobile device 101. Screenshot 202 illustrates a presentation of single ONE card statement 123 on mobile device 101. Although single ONE card statement 123 is shown on a mobile device 101, In one embodiment, single ONE card statement 123 could be a paper statement provided to the cardholder (e.g., a monthly statement or the like).

Screenshot 203 is a single ONE card account 180 summary page presented on mobile device 101. In one embodiment, screenshot 203 is a breakdown of the single ONE card statement 123 for one of the similarly managed credit accounts (e.g., first credit account 175A or 175C). In another embodiment, screenshot 203 is a single ONE card statement 123 that has combined the information from each of the similarly managed credit accounts that make up the single ONE card account 180.

Screenshot 204 shows a digital (or virtual) single ONE card account 180 "card" as presented on mobile device 101. Screenshot 205 illustrates a transaction history page as presented by single ONE card system 100 on mobile device 101. Screenshot 206 is a single ONE card account 180 bill payment page as presented on mobile device 101. Screenshot 207 illustrates a digital reward from the single ONE card account 180 on mobile device 101.

Although FIG. 2 includes a plurality of screen shots from a digital device. It should be appreciated that any of the information presented in FIG. 2 could be provided in a physical form to the cardholder. Similarly, although the virtual single ONE card account 180 "card" is shown in screenshot 204, a physical single ONE card account 180 card could also be issued, provided to the cardholder, or the like.

With reference now to FIG. 3, a flow diagram 300 of a method for combining at least two similarly managed credit accounts into a single ONE card account is shown in accordance with an embodiment.

Referring now to 305 of FIG. 3 and to FIG. 1, one embodiment identifies, at a computer system, a first credit account 175A and a second different credit account 175C associated with a cardholder, the first credit account 175A and the second different credit account 175C managed by a single entity.

In one embodiment, the computer system is a financial management system and the identifying of the first credit account 175A and the second different credit account 175C associated with the cardholder includes the searching, at the financial management system, at least one database (e.g., memory store 165) containing a plurality of credit accounts (e.g., set of credit accounts 175) for any credit accounts associated with the cardholder.

In one embodiment, the computer system is the cardholder's mobile device 101 and the identifying of the first credit account 175A and the second different credit account 175C associated with the cardholder includes searching a digital wallet of the mobile device for any credit accounts (e.g., one or more of the set of credit accounts 175), and searching any applications (apps) on the mobile device 101 for any credit account apps having a credit account associated with the cardholder.

In yet another embodiment, the identifying of the first credit account 175A and the second different credit account 175C associated with the cardholder includes searching at least one database (e.g., memory store 165) of the financial management system, searching a digital wallet of the mobile device for any credit accounts (e.g., one or more of the set of credit accounts 175), and searching any applications (apps) on the mobile device 101 for any credit account apps having a credit account associated with the cardholder.

With reference now to 310 of FIG. 3 and to FIG. 1, one embodiment generates, at the computer system, a single ONE card account 180 for the cardholder.

Referring now to 315 of FIG. 3 and to FIG. 1, one embodiment incorporates, at the computer system, the first credit account 175A and the second different credit account 175C into the single ONE card account 180.

With reference now to 320 of FIG. 3 and to FIG. 1, one embodiment manages, at the computer system, any future transactions for the first credit account 175A and the second different credit account 175C with the single ONE card account 180.

Thus, any cardholder that has two or more active credit accounts, that are managed by the same bank or commercial finance company (hereinafter, "similarly managed credit accounts"), can apply for a single cobrand product that will combine all of the cardholders similarly managed credit accounts into a single ONE card account 180. By combining the similarly managed credit accounts into a single ONE card account 180, the number of physical cards carried by the cardholder will be reduced. Moreover, in one embodiment, the use of the single ONE card account 180 will not change the cardholder ability to keep, obtain, and earn the same rewards from spending in the different brand stores for each of the cardholder's similarly managed credit accounts.

In one embodiment, the single ONE card account 180 includes an app (or another interface) that allows the cardholder to add two or more of the similarly managed credit accounts to the app. Once the similarly managed credit accounts are added, the cardholder can then manage the added similarly managed credit accounts via a single account center (e.g., ONE card system 100).

In one embodiment, the cardholder is able to monitor all of the similarly managed credit accounts via a login to a single managed account.

In one embodiment, the cardholder is able to get one single ONE card statement 123 for the single ONE card account 180 instead of a different statement for each of the similarly managed credit accounts that have been added to the single ONE card account 180 (or single ONE card app on the cardholder's mobile device 101.

In addition to the reduction in PLCC management, the real-estate taken up by the different PLCC cards, and the like; single ONE card account 180 can offer additional categories, incentives, rewards, offers, and the like, such as for example, a ONE card additional 2% cash back on some purchases, 1% cash back on other purchases, or the like.

In one embodiment, instead of the single ONE card account 180 being a single card that is carried in place of the different cards for each of the similarly managed credit accounts. The front end could remain with the cardholder, such that the cardholder can continue to carry and utilize the different PLCC physical cards while the single ONE card account 180 aspects would be utilized on the backend. For example, on the front end, the cardholder could keep and use a different physical PLCC card at each different brand. However, the backend management of each of the similarly managed credit accounts would become similar to the single ONE card account 180 management discussed herein. For example, even though the cardholder used the brand physical card, the charges would show up on the single ONE card statement 123, the cardholder could use a single application to manage each of the similarly managed credit accounts, there would only need to be a single login or URL for the cardholder to reach any of the similarly managed credit accounts, and the like.

In one embodiment, the single ONE card statement 123 could be broken down into different brands such that the cardholder's purchases would be clearly delineated by brand.

In one embodiment, the single ONE card statement 123 could have a single payment due date. In another embodiment, the single ONE card statement 123 could include a number of different payment due dates based on one or more of the different brand PLCC accounts such that the cardholder's payment schedule would be spread out over a given time period (or remain as previously scheduled per PLCC). In one embodiment, the choice of a single payment due date or a number of different payment due dates could be cardholder defined.

For example, suppose the user had a department store PLCC with a payment due date on the 3rd of the month, and the cardholder also had a similarly managed Shoe store PLCC with a payment due date on the 18th of the month. The cardholder may have selected the different due dates to make sure that they had enough funds to cover the payments by the given due dates (e.g., the cardholder is paid on the 1st and the 15th or the like). In this case, the cardholder would not want to use the single ONE card account 180 with a single payment due date because they may not have that amount of money available on the single due date.

However, by choosing to keep the original payment due dates, the cardholder would get the single ONE card statement 123, but the statement would include the amount due on the 3rd of the month and the different amount due on the 18th of the month. Thus, the cardholder would be able to obtain the management advantages of the single ONE card system 100 while retaining the granularity as provided by each of the different similarly managed credit accounts.

Thus, the ONE card system 100 allows a cardholder to manage some or all of their credit accounts in one account center and/or in a single app. Further, the cardholder can use previously unavailable technology such as contactless payment, EMV tap and dip, and co-branded rails at their brand. Moreover, the cardholder will continue to earn all of their rewards from existing PLCC cards that can only be used at those retailers.

In addition, the cardholder will earn single ONE card account 180 rewards (such as 2% and 1% categories), choose one retailer each quarter (or other timeframe) to redeem the single ONE card account 180 specific rewards.

The single ONE card system 100 will also provide the opportunity for a credit account provide to offer balance transfers, to shift programs to when a retailer goes out of business, to provide a fixed financing structure for all brands, and/or the like. Moreover, by combining the statements from each individual brand into the single ONE card statement 123, the credit account provider can save money, reduce their credit account management footprint, continue to receive category and sku level data from the retailer for any transactions. and the like.

Further, the single ONE card system 100 will allow existing retailer brand cards to remain active and not have to be part of a reissue. In one embodiment, the credit account provider can use ONE card account 180 cardholder demographics and spend data to offer a cardholder the opportunity to enroll in other similarly managed credit account programs (so long as they are not a conflict with a cardholder's existing credit accounts).

In one embodiment, if the cardholder applies for a competitor's card on her own (in store or online), they may be allowed to add it to her single ONE card account 180. In one embodiment, the single ONE card account 180 will provide the cardholder with a physical card having a premium weight, look, and feel.

Example Computer System

Figure 4:
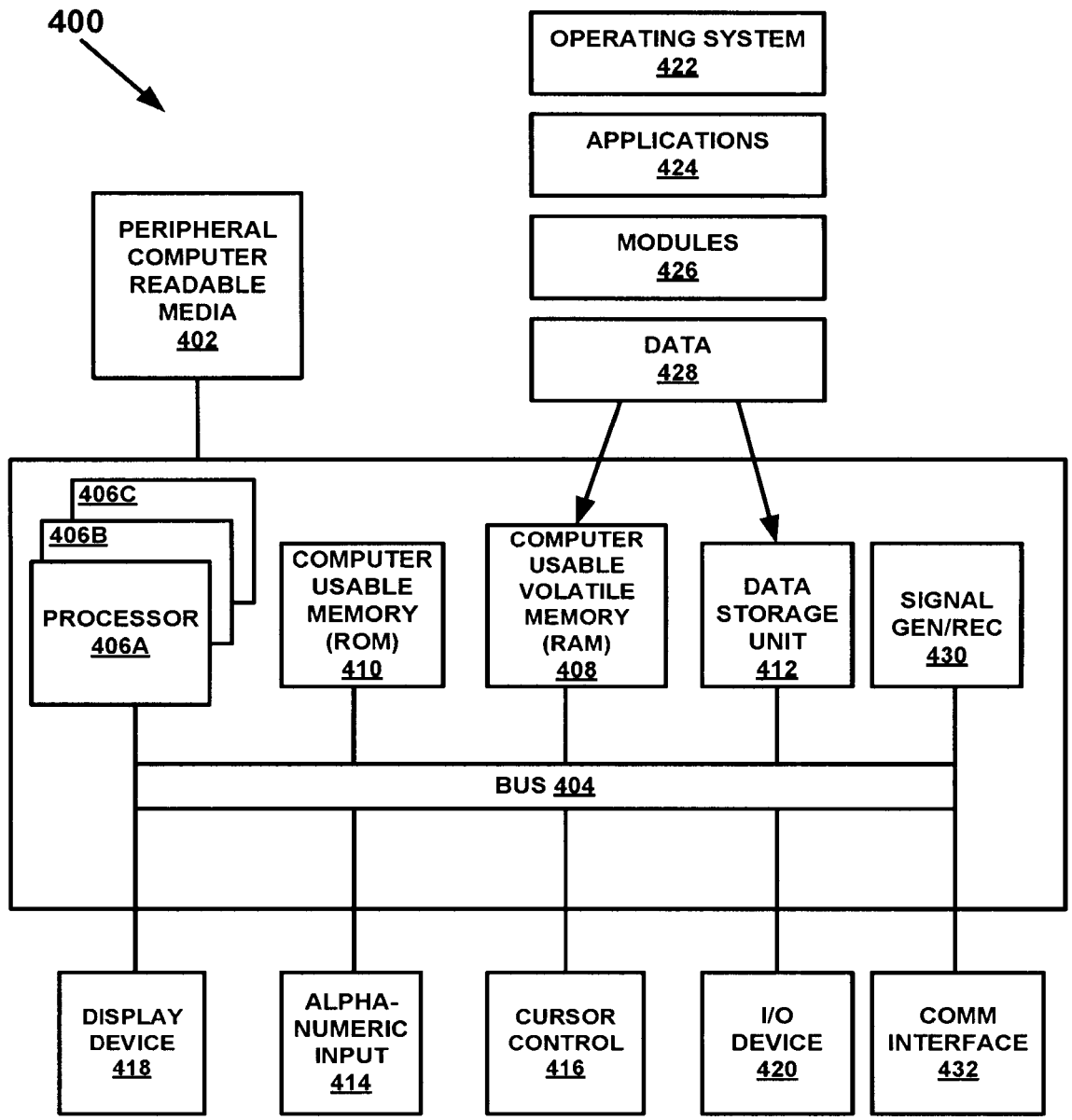
FIG. 4 is a block diagram of an example computer system with which or upon which various embodiments of the present invention may be implemented.

With reference now to FIG. 4, a block diagram of an example computer system with which or upon which various embodiments of the present invention may be implemented is shown. It should be appreciated that one or more of the embodiments may be composed of computer-readable and computer-executable instructions that reside, for example, in a non-transitory computer-readable medium.

Although FIG. 4 illustrates an example computer system 400 used in accordance with embodiments of the present technology. It is appreciated that system 400 of FIG. 4 can operate on or within a number of different computer systems including general purpose networked computer systems, computer-readable and computer-executable instructions that reside, for example, in non-transitory computer-readable medium, embedded computer systems, routers, switches, server devices, user devices, various intermediate devices/artifacts, stand-alone computer systems, mobile phones, personal data assistants, televisions and the like.

Computer system 400 of FIG. 4 is well adapted to having peripheral computer readable media 402 such as, for example, an external storage drive, a compact disc, a flash drive, a thumb drive, a wireless radio enabled device, and the like coupled thereto.

Computer system 400 of FIG. 4 includes an address/data/control bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled to bus 404 for storing information and instructions for processors 406A, 406B, and 406C.

System 400 also includes computer usable non-volatile memory 410, e.g., read only memory (ROM), coupled to bus 404 for storing static information and instructions for processors 406A, 406B, and 406C. Also present in system 400 is a data storage unit 412 (e.g., a magnetic disk drive, optical disk drive, solid state drive (SSD), and the like) coupled to bus 404 for storing information and instructions. Computer system 400 also includes an optional alpha-numeric input device 414 including alphanumeric and function keys coupled to bus 404 for communicating information and command selections to processor 406A or processors 406A, 406B, and 406C. Computer system 400 also includes an optional cursor control device 416 coupled to bus 404 for communicating user input information and command selections to processor 406A or processors 406A, 406B, and 406C. Optional cursor control device may be a touch sensor, gesture recognition device, and the like. Computer system 400 of the present embodiment also includes an optional display device 418 coupled to bus 404 for displaying information.

Referring still to FIG. 4, optional display device 418 of FIG. 4 may be a liquid crystal device, cathode ray tube, OLED, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick, non-contact input, gesture recognition, voice commands, bio recognition, and the like. In addition, special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

Computer system 400 also includes an I/O device 420 for coupling system 400 with external entities. For example, in one embodiment, I/O device 420 is a modem for enabling wired or wireless communications between system 400 and an external network such as, but not limited to, the Internet or intranet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400.

System 400 also includes one or more signal generating and receiving device(s) 430 coupled with bus 404 for enabling system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one or more communication interface(s) 432 for coupling information to and/or from system 400. Communication interface 432 may include a serial port, parallel port, Universal Serial Bus (USB), Ethernet port, Bluetooth, thunderbolt, near field communications port, WiFi, Cellular modem, or other input/output interface. Communication interface 432 may physically, electrically, optically, or wirelessly (e.g., via radio frequency) couple system 400 with another device, such as a mobile telephone, radio, or computer system.

The computing system 400 is only one example of a suitable computing environment and is not intended to suggest any limitation as to the scope of use or functionality of the present technology. Neither should the computing environment be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for combining at least two similarly managed credit accounts into a single ONE card account, the method comprising:
   searching, at a computer system, at least one database containing a plurality of credit accounts for any credit accounts associated with a cardholder;
   identifying, at said computer system, a first credit account and a second different credit account associated with said cardholder,
      the first credit account and the second different credit account managed by a single entity;
   evaluating said first credit account and the second different credit for a conflict of interest;
   determining, based on said evaluating, that said first credit account and the second different credit are non-conflicting;
   generating, at the computer system, a single ONE card account for the cardholder;
   incorporating, at the computer system and without any additional input, the first credit account and the second different credit account into the single ONE card account; and
   managing, at the computer system, any future transactions for the first credit account and the second different credit account with the single ONE card account.

2. The method of claim 1, wherein the computer system is a financial management system.

3. The method of claim 1, wherein the computer system is a mobile device of the cardholder and the identifying further comprises:
   searching a digital wallet of the mobile device for any credit accounts;
   searching any applications (apps) on the mobile device for any credit account apps;
   performing a conflict-of-interest evaluation between the first credit account and the second different credit account in the single ONE card account and any found credit accounts in said digital wallet, and any found credit accounts apps on said mobile device to identify one or more non-conflicting credit accounts in said digital wallet and one or more non-conflicting credit accounts apps on said mobile device; and
   incorporating, at the computer system and without any additional input, said one or more non-conflicting credit accounts in said digital wallet and said one or more non-conflicting credit accounts apps on said mobile device, into the single ONE card account.

4. The method of claim 1, wherein the identifying further comprises:
   searching, any credit account databases associated with a financial management system, for any credit accounts associated with the cardholder;

searching a mobile device of the cardholder for any credit accounts on said mobile device;
performing a conflict-of-interest evaluation between the first credit account and the second different credit account in the single ONE card account and any found credit accounts associated with the cardholder, and any found credit accounts on said mobile device to identify one or more non-conflicting credit accounts associated with said cardholder and one or more non-conflicting credit accounts on said mobile device; and
incorporating, at the computer system and without any additional input, said one or more non-conflicting credit accounts associated with said cardholder and said one or more non-conflicting credit accounts on said mobile device, into the single ONE card account.

5. The method of claim 1, further comprising:
automatically adding a ONE card application comprising the single ONE card account to a mobile device of the cardholder.

6. The method of claim 1, further comprising:
adding the single ONE card account to a digital wallet on a mobile device of the cardholder; and
removing the first credit account and the second different credit account from the digital wallet.

7. The method of claim 1, further comprising:
providing a physical single ONE card to the cardholder, the physical single ONE card replacing a first credit account physical card and a second different credit account physical card;
canceling the first credit account physical card; and
canceling the second different credit account physical card.

8. The method of claim 1, further comprising:
providing via the single ONE card account a single account statement,
the single account statement including information previously provided separately by each of the first credit account and the second different credit account.

9. The method of claim 8, wherein the single account statement further comprises:
determining a first credit account balance for the first credit account;
determining a second different credit account balance for the second different credit account;
providing a first payment due date for the first credit account; and
providing a second payment due date for the second different credit account.

10. The method of claim 8, wherein the single account statement further comprises:
determining a first credit account balance for the first credit account;
determining a second different credit account balance for the second different credit account;
combining the first credit account balance and the second different credit account balance into a single ONE card account balance; and
providing a single payment due date for the single ONE card account.

11. The method of claim 1, further comprising:
managing, at the single ONE card account, a first reward earnings for the first credit account;
managing, at the single ONE card account, at least a second reward earnings for at least the second different credit account; and
providing, a single ONE card reward earnings from the single ONE card account.

12. The method of claim 11, further comprising:
providing, at the single ONE card account, a reward exchange capability,
the reward exchange capability providing the cardholder an ability to exchange any of the first reward earnings, the second reward earnings, and the single ONE card reward earnings with any other of the first reward earnings, the second reward earnings, and the single ONE card reward earnings.

13. A non-transitory computer-readable medium for storing instructions, the instructions comprising:
one or more instructions which, when executed by one or more processors, cause one or more processors to:
search at least one database containing a plurality of credit accounts for any credit accounts associated with a given cardholder;
identify said given cardholder having a plurality of similarly managed credit accounts;
generate a single ONE card account for the given cardholder;
perform a conflict-of-interest evaluation for each of the plurality of similarly managed credit accounts;
identify a plurality of non-conflicting similarly managed credit accounts from said plurality of similarly managed credit accounts;
incorporate, without input from the given cardholder, the plurality of non-conflicting similarly managed credit accounts into the single ONE card account;
manage any future transactions for each of the plurality of non-conflicting similarly managed credit accounts via the single ONE card account; and
provide, to the given cardholder, a single ONE card account statement,
the single ONE card account statement containing information previously provided separately by each of the plurality of non-conflicting similarly managed credit accounts.

14. The non-transitory computer-readable medium of claim 13, where the single ONE card account is incorporated into a ONE card application operating on a mobile device of the given cardholder.

15. The non-transitory computer-readable medium of claim 14, wherein the plurality of similarly managed credit accounts are selected from one or a combination of credit accounts from the group consisting of: a private label credit card (PLCC) account, a co-branded credit account, and a universal PLCC account.

16. The non-transitory computer-readable medium of claim 13, where the one or more instructions further cause one or more processors to:
automatically search a digital wallet on a mobile device of the given cardholder to identify any similarly managed credit accounts;
performing a conflict-of-interest evaluation between the plurality of non-conflicting similarly managed credit accounts in the single ONE card account and any found similarly managed credit accounts in said digital wallet to identify one or more non-conflicting similarly managed credit accounts in said digital wallet; and
incorporate, without input from the given cardholder, said one or more non-conflicting similarly managed credit accounts in said digital wallet into the single ONE card account.

17. The non-transitory computer-readable medium of claim 13, where the one or more instructions further cause one or more processors to:
- automatically search a database associated with a financial management system to identify any similarly managed credit accounts;
- performing a conflict-of-interest evaluation between the plurality of non-conflicting similarly managed credit accounts in the single ONE card account and any found similarly managed credit accounts in said database associated with said financial management system to identify one or more non-conflicting similarly managed credit accounts in said database associated with said financial management system; and
- incorporate, without input from the given cardholder, said one or more non-conflicting similarly managed credit accounts in said database associated with said financial management system into the single ONE card account.

18. The non-transitory computer-readable medium of claim 13, where the one or more instructions further cause one or more processors to:
- automatically order a physical ONE card for the single ONE card account,
  - the physical ONE card to replace at least two physical cards associated with the plurality of similarly managed credit accounts;
- receive an indication of a receipt of the physical ONE card by the given cardholder; and
- cancel the at least two physical cards replaced by the physical ONE card.

19. The non-transitory computer-readable medium of claim 13, where the one or more instructions further cause one or more processors to:
- automatically order a physical ONE card for the single ONE card account,
  - the physical ONE card to replace all existing physical cards associated with the plurality of similarly managed credit accounts;
- receive an indication of a receipt of the physical ONE card by the given cardholder; and
- cancel all existing physical cards associated with the plurality of similarly managed credit accounts.

* * * * *